United States Patent
Fukushima (10) Patent No.: US 7,961,582 B2
(45) Date of Patent: Jun. 14, 2011

(54) OPTICAL DISK RECORDING APPARATUS, LASER DIODE DRIVING APPARATUS AND RECORDING SIGNAL GENERATING APPARATUS

(75) Inventor: Akio Fukushima, Yokohama (JP)

(73) Assignees: Hitachi, Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 1443 days.

(21) Appl. No.: 11/154,182

(22) Filed: Jun. 15, 2005

(65) Prior Publication Data

US 2006/0087946 A1    Apr. 27, 2006

(30) Foreign Application Priority Data

Oct. 22, 2004 (JP) ................................. 2004-307585

(51) Int. Cl.
*G11B 7/0045* (2006.01)
*G11B 7/125* (2006.01)

(52) U.S. Cl. ................. 369/59.12; 369/47.51; 369/53.26

(58) Field of Classification Search .... 369/44.32–44.33, 369/47.15–47.17, 47.28–47.3, 47.5–47.53, 369/53.25–53.26, 53.31, 53.34–53.37, 59.1–59.14, 369/59.2

See application file for complete search history.

(56) References Cited

U.S. PATENT DOCUMENTS

| 4,907,212 | A | * | 3/1990 | Pharris et al. | ............... | 369/44.26 |
| 4,998,234 | A | * | 3/1991 | Rees et al. | ................. | 369/44.27 |
| 6,445,661 | B1 | * | 9/2002 | Wu | ............................... | 369/59.2 |
| 6,721,255 | B1 | * | 4/2004 | Gushima et al. | ............ | 369/59.12 |
| 6,735,159 | B2 | * | 5/2004 | Sugiyama | ................... | 369/59.11 |
| 2002/0097644 | A1 | * | 7/2002 | Kadlec et al. | .............. | 369/44.29 |
| 2003/0026177 | A1 | * | 2/2003 | Wu et al. | ..................... | 369/44.29 |
| 2004/0257949 | A1 | * | 12/2004 | Hsu et al. | ...................... | 369/59.2 |

FOREIGN PATENT DOCUMENTS

| JP | 2001-202625 | 7/2001 |
| JP | 2004-005900 | 1/2004 |
| JP | 2004-005900 A | 1/2004 |
| JP | 2004-152335 | 5/2004 |
| JP | 2004-152335 A | 5/2004 |
| JP | 2004-213763 A | 7/2004 |

OTHER PUBLICATIONS

Japan Patent Office (JPO) office action for JPO patent application JP2008-300337 (Jul. 27, 2010).
USPTO Office Action dated Jan. 25, 2011 for U.S. Appl. No. 12/545,445.

* cited by examiner

*Primary Examiner* — Wayne R Young
*Assistant Examiner* — Nathan A Danielsen
(74) *Attorney, Agent, or Firm* — Kilpatrick Townsend & Stockton LLP (57) ABSTRACT

The optical disk recording apparatus has the function of correcting the timing shift of the write strategy signal caused by the change in the operating environment of the digital signal processing circuit including the write strategy generating circuit, the laser drive circuit for driving the laser at the time of recording and the flexible printed board for electrical connection between the digital signal processing circuit and the laser drive circuit. Upon determination that the timing shift correction is required, the timing shift is reduced by operating the timing shift correcting function.

10 Claims, 9 Drawing Sheets

SIGNAL WAVEFORM FOR TIMING SHIFT DETECTING OPERATION

FIG. 4

SIGNAL WAVEFORM FOR TIMING SHIFT CORRECTION

OPTICAL DISK RECORDING APPARATUS, LASER DIODE DRIVING APPARATUS AND RECORDING SIGNAL GENERATING APPARATUS

INCORPORATION BY REFERENCE

The present application claims priority from Japanese application JP 2004-307585 filed on Oct. 22, 2004, the content of which is hereby incorporated by reference into this application.

BACKGROUND OF THE INVENTION

1. Field of the Invention

The present invention relates an optical disk recording apparatus, a laser diode driving apparatus and a recording signal generating apparatus for adjusting the recording signal to drive the laser diode and the timing of the laser light emission at the time of recording.

2. Description of the Related Art

The write strategy signal requires a very high timing accuracy, and a timing shift, if any, makes it impossible to obtain a predetermined write strategy, thereby directly deteriorating the recording quality. Actually, the timing of the write strategy signal is liable to be affected by the manufacturing variations of a circuit on the signal line, a change in an environmental factor such as temperature or a change in the electrical conditions of the signal transmission line, and the timing shift between signals is not same. In designing the optical disk recording apparatus, therefore, a great problem to be solved is how to maintain the timing accuracy of the write strategy signal in steady state within a tolerable range.

To cope with this problem, in the prior art, a variable delay circuit is inserted in a digital signal processing circuit including a write strategy generating circuit, and the delay time of the variable delay circuit is set in such a manner as to correct the mutual timing shift of the write strategy signals thereby to eliminate the timing shift at the time of designing the optical disk recording apparatus.

Figure 5:
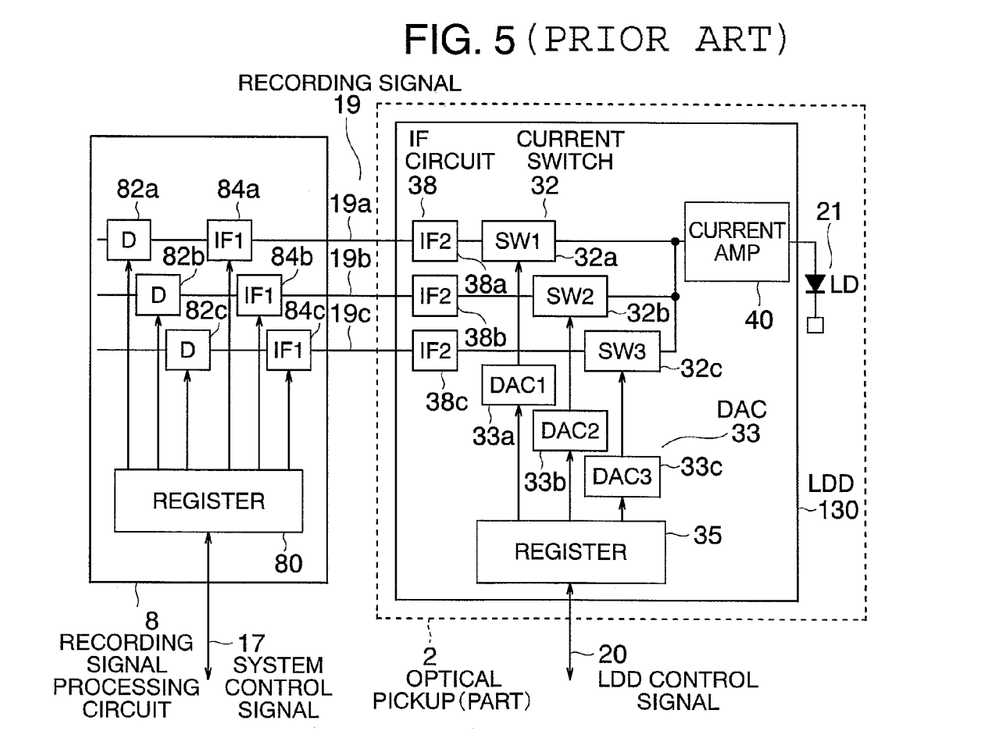
FIG. 5 is a diagram showing the prior art.

FIG. 5 shows an example of circuit blocks in which a digital signal processing circuit including the conventional write strategy generating circuit has a variable delay circuit, and the delay time of the variable delay circuit is set in such a manner as to correct the timing shift of the write strategy signals at the time of designing the device thereby to eliminate the timing shift.

The signal generated by a recording strategy generating circuit (not shown) in a recording signal processing circuit 8 is input to a variable delay circuit 82. The signal propagation delay time of the variable delay circuit 82 can be set by a system control signal 17 through a register circuit 80. The output of the variable delay circuit 82 is input to an IF circuit 84. The IF circuit 84 converts the signal level in the recording signal processing circuit 8 to the level of a recording signal 19 and outputs the recording signal 19. The recording signal 19 is transmitted through a printed circuit board, a flexible printed circuit board, a circuit board on an optical pickup, connectors used to connect these circuit boards to each other, an input interface circuit for a laser drive LSI and a laser drive current switch. The signal propagation delay time in this signal transmission path is generally varied between the paths a, b and c of the recording signal 19 depending on the difference of the signal path length and the delay time of the circuit.

The conventional techniques are described in JP-A-2001-202625 and JP-A-2004-152335.

SUMMARY OF THE INVENTION

The effect of the shift of the signal propagation delay time on the laser light emission waveform is explained.

Figure 8:
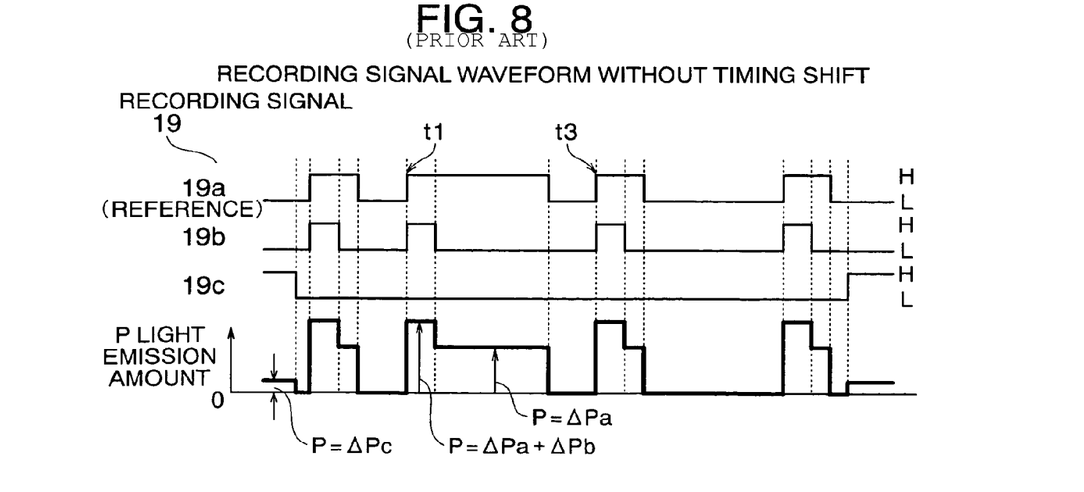
FIG. 8 shows the relation between the recording waveform and the light emission amount.

FIG. 8 is a schematic diagram showing the relation between the recording signal 19 and a laser light emission waveform. The recording signal 19 is a logic signal which assumes either H or L level. Each recording signal 19 corresponds to a predetermined increment of the light emission amount. For example, the increment is 0 for the recording signal 19x (x: a, b, c) at L level, and the increment is ΔPx at H level. In the case where only the recording signal 19a is at H level and the others are at L level, for example, the light emission amount P=ΔPa, while in the case where all the signals are at H level, on the other hand, P=ΔPa+ΔPb+ΔPc.

Figure 9:
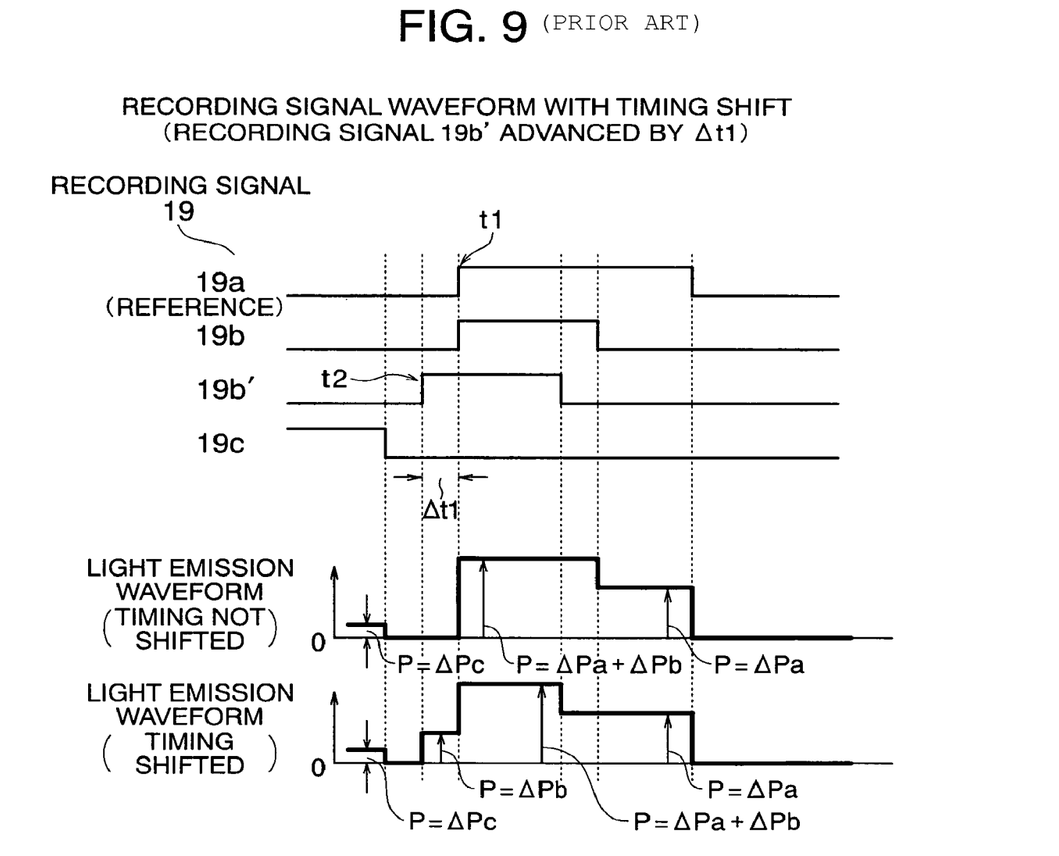
FIG. 9 shows the relation between the recording waveform and the light emission amount with a timing shift.

FIG. 9 is a schematic diagram showing the light emission amount waveform in the case where the recording signal 19 develops a timing shift. FIG. 9 shows the case in which the recording signal 19 which should be a recording signal 19b has shifted in timing to a recording signal 19b' as the result of a change quicker by Δt1. In spite of the fact that the recording signals 19a and 19b should rise at the same time, the recording signal 19b' rises before the recording signal 19a. In the light emission waveform, therefore, the state P=ΔPb newly occurs during Δt1, so that the period P=ΔPa+ΔPb is shortened by Δt1. This change of the light emission waveform is required to be avoided as it causes a change in the recording mark on the optical disk and deteriorates the recording quality. In this case, therefore, the recording signal 19b' is required to be delayed by Δt1 into the original recording signal 19b.

At the time of device design, therefore, the delay time of each of the variable delay circuits 82a, 82b, 82c is adjusted using a reference device to finally secure the desired light emission waveform from the laser. In this way, the difference of the signal propagation delay time is offset.

Nevertheless, the process of correcting the delay time by controlling the setting of the variable delay circuit 82 using a reference device at the time of device design, however, fails to take individual differences of devices into consideration, and therefore poses the problem that a timing shift still occurs for an individual deviated from the reference device at the time of design. In a method proposed to overcome this problem, the delay time of each of the variable delay circuits 82a, 82b, 82c is adjusted to secure the desired light emission waveform from the laser for each individual device at the time of shipment after manufacture, so that the difference of the signal propagation delay time due to the individual differences is offset. Even in this method, as long as the device is located in a different environment from the point of shipment, the timing shift described above may occur and cannot be obviated.

As described above, the write strategy signal requires a high timing accuracy, and therefore even a slight timing shift considerably affects the recording quality. For this reason, the write strategy signal is required to be maintained in satisfactory state against the change in the transmission waveform due to the impedance change caused by the change in the distance between the flexible printed board and the peripheral parts thereof as well as the change in the internal device temperature, the source voltage of the related circuit portions or the variations due to the process of the integrated circuit. In the prior art, however, once the design setting of the variable delay circuit is adjusted, there is no way of adjusting the delay time, and no method is available to cope with the variations unique to a device such as the variations of the LSI process or the source voltage. It still remains a great problem, therefore, how to reduce the effect of the variations of the above-mentioned factors unique to individual devices and secure the stable recording quality of the optical disk recording apparatus.

Accordingly, it is an object of this invention to provide an optical disk apparatus comprising a function of detecting and correcting the timing shift of the write strategy signal generated by the variations of the operating environment of a digital signal processing circuit including a write strategy generating circuit, a laser drive circuit for driving the laser used in the recording operation, a flexible printed board for electrically connecting the digital signal processing circuit and the laser drive circuit, etc., wherein the function of correcting the timing shift is operated to reduce the timing shift upon determination that the correction of the timing shift is required.

The timing shift detection function generally includes a normal mode and a timing shift detection mode in which a timing shift detection signal is output from a timing shift detection signal generating circuit, and the shift of the input timing shift detection signal is detected by the laser drive circuit.

In the recording mode, a plurality of digital signals of different timings corresponding to the write strategy are output from the write strategy generating circuit. Each of the digital signals is transmitted through the output driver of the digital signal processing LSI, the printed circuit board, the flexible printed circuit board, the circuit board of an optical pickup, the connectors used to connect these circuit boards to each other, the input interface circuit of the laser drive LSI, the variable delay circuit and the laser drive current switch.

In the timing shift detection mode, on the other hand, a timing shift detection signal is output from the timing shift detection signal generating circuit and transmitted through the same route as the digital signal.

Then, in the detection mode for detecting the timing shift, the output signal selector of write strategy generating circuit of digital signal processor switch its output with the signal changing with the same timing or the signal changing with the predetermined timing suitable for detecting the timing shift of the signal paths more than two which are the objects for detecting the timing shift. In addition, in the laser driving circuit, the time difference detection circuit detect the time difference between the signals more than two which are the detection objects for the timing shift from the timing shift detection signal which added delay time outputted from the variable delay circuit.

In the case where it is determined that the correction of the timing shift detected by the time lag detection circuit is required, the delay time of the variable delay circuit is controlled to correct the timing shift into a predetermined range.

With this optical disk recording apparatus, the recording operation can be performed with the desired recording waveform and a stable recording quality is obtained.

Other objects, features and advantages of the invention will become apparent from the following description of the embodiments of the invention taken in conjunction with the accompanying drawings.

DESCRIPTION OF THE EMBODIMENTS

Embodiments of the invention are explained below with reference to the drawings.

First Embodiment

Generally, when recording data in an optical disk, the light emission timing and the light emission power of the laser beam used for recording are controlled to produce the record of an appropriate size and shape at an appropriate position on the recording layer on the disk. This control operation is required in view of the fact that the process of recording on the recording layer by a laser beam utilizes the phenomenon that the temperature of the recording layer is increased by converting optical energy to thermal energy. Specifically, there exists a time lag between the light radiation and the temperature increase, and further the temperature increase of the recording layer is affected by the heat conduction of the disk.

In order to record the data on the recording layer as expected, therefore, the light emission waveform of the laser beam used for recording is required to be controlled. The process for generating signals used to control the recording power and the recording timing required for controlling the laser light emission waveform from the recording data signal are generally called the "write strategy" process. The recording quality of the optical disk recording apparatus depends on the write strategy. The write strategy, therefore, is a very crucial technique in the optical disk recording apparatus.

The write strategy is a process for determining the light emission timing and the light emission amount for recording a mark. The light emission timing and the light emission amount are required to be changed with the length of the mark recorded and the length of the space before and after the particular mark. This is a complicated process to realize. The write strategy generating circuit, therefore, is often incorporated in the digital signal processing circuit constituting a large scale integration circuit.

Also, the laser drive circuit normally includes three to five sets of parallel drive units having a current source capable of changing the current amount supplied from outside and a current switch for switching the output of the current source at high speed. The currents output from the respective units are added to drive the semiconductor laser. A plurality of the drive units are required by reason of the requirement of two to four types of recording power levels of the laser beam radiated to form a mark on the information recording layer at the time of recording the data. The DVD-R disk, for example, may require three types of optical power levels to record data therein.

In recent years, the maximum recording speed of the optical disk recording apparatus such as the DVD (digital versatile disk) has increased to 16 fold associated with the shortest recording mark (3T mark) of about 14 ns in terms of pulse length. Further, the measure of the jitters for reproducing the recorded signal is considered about 8%. The control accuracy of the write strategy timing required to satisfy these conditions is not more than 0.5 ns or about one tenth of 1T. Thus, the write strategy timing is adjusted sometimes at intervals of 0.1 ns.

To control the light emission power of the laser diode at a high timing accuracy as described above, the laser drive circuit is arranged in the neighborhood of the laser so that the laser diode of a comparatively low impedance can be driven at high speed. In the optical disk recording apparatus such as CD or DVD, therefore, the laser drive circuit is arranged on the optical pickup together with the laser. Thus, the write strategy signal is transmitted to the flexible printed board used for signal transmission between the circuit board including a digital signal processing circuit having the write strategy generating circuit built therein and the pickup including the laser drive circuit.

First, the general configuration of the optical disk recording apparatus according to the invention is explained with reference to FIG. 2. This first explanation is followed by the next explanation, with reference to FIG. 1, about a recording signal processing circuit 8 including a recording strategy generating circuit and a laser diode driver (hereinafter referred to as LDD) 30 to drive the laser used for recording. The recording signal processing circuit 8 and the laser diode driver 30 are circuit blocks required to correct the timing shift according to the invention.

Figure 2:
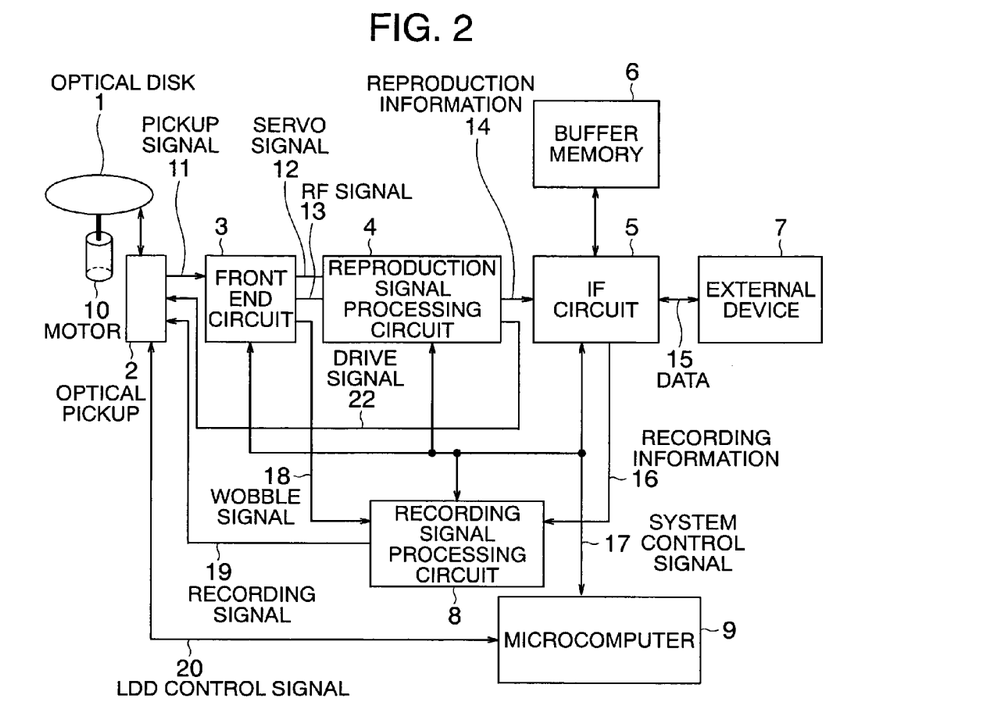
FIG. 2 is a block diagram showing a general configuration according to the first embodiment.

A general configuration of the optical disk recording apparatus according to a first embodiment of the invention is shown in the block diagram of FIG. 2. The optical disk 1 is an information recording medium capable of recording information upon radiation of the laser beam thereon, and for example, CD-R, CD-RW, DVD-R, DVD-RW, DVD-RAM, BD-R or BD-RE.

The optical pickup 2 is configured of an optical system, a light detector, a semiconductor laser, a semiconductor laser drive circuit and an actuator to converge the laser beam on a predetermined track of a predetermined information recording layer of an optical disk 1 and record and reproduce information.

A pickup signal 11 is configured of a signal detected from the light reflected from the signal recording layer of the optical disk 1, a servo signal used for position control of the objective lens and the optical pickup and a front monitor signal corresponding to the laser light emission amount.

A front end circuit 3 processes the pickup signal 11 as predetermined, and outputs a servo signal such as a focus error signal or a tracking error signal, a RF signal 13 and a wobble signal 18. These signals are used as a servo control signal to radiate the laser beam and form a light spot at a predetermined position on the optical disk, the recording information corresponding to the mark/space on the information recording layer at the light spot position and the address information formed as a wobble on the optical disk in advance, respectively.

A reproducing signal processing circuit 4 performs such operation as binarization, clock reproduction, data strobe, data demodulation, decoding and error correction based on the RF signal 13 and outputs a reproduction signal 14. Also, the servo signal 12 is subjected to phase compensation and amplification and a drive signal 22 is output. The drive signal 22 is applied to a focus actuator and a tracking actuator (none of which are shown) in the optical pickup 2 to perform a predetermined focusing control and tracking control operation.

An interface circuit 5 controls the reproduction signal 14 through a buffer memory 6 while outputting data to an external device 7 at the time of reproduction. At the time of recording, on the other hand, the data input from the external device 7 is controlled through the buffer memory 6 while outputting data to the recording signal processing circuit 8.

The recording signal processing circuit 8 adds an error correction code to, encodes and modulates the data input from the interface circuit 5, and outputs a LDD control signal 20 for controlling the laser light emission amount to form a predetermined recording mark on the information recording layer of the optical disk.

The LDD control signal 20 is input to a LDD 30 (not shown) in the optical pickup 2. The LDD 30 controls the current flowing in the laser diode in such a manner that predetermined optical power is output from a laser diode (not shown) at a predetermined timing in accordance with the input LDD control signal 20. The laser beam emitted from the laser diode is passed through the optical system in the optical pickup and focused at a predetermined position on the information recording layer of the optical disk 1 thereby to form a predetermined recording mark.

A microcomputer 9 controls the optical disk recording apparatus as a whole in accordance with a control program. Generally, the control operation is performed by exchanging the system control signal 17 through a control bus line connected to various LSIs.

A motor 10 rotates the optical disk 1 at a predetermined speed to record or reproduce information. The rotational speed of the motor 19 is controlled by the microcomputer 9, the reproduction signal processing circuit 4 or the recording signal processing circuit 8.

Next, the operation of the recording signal processing circuit 8 and the laser diode driver 30 for recording the data is explained.

Figure 1:
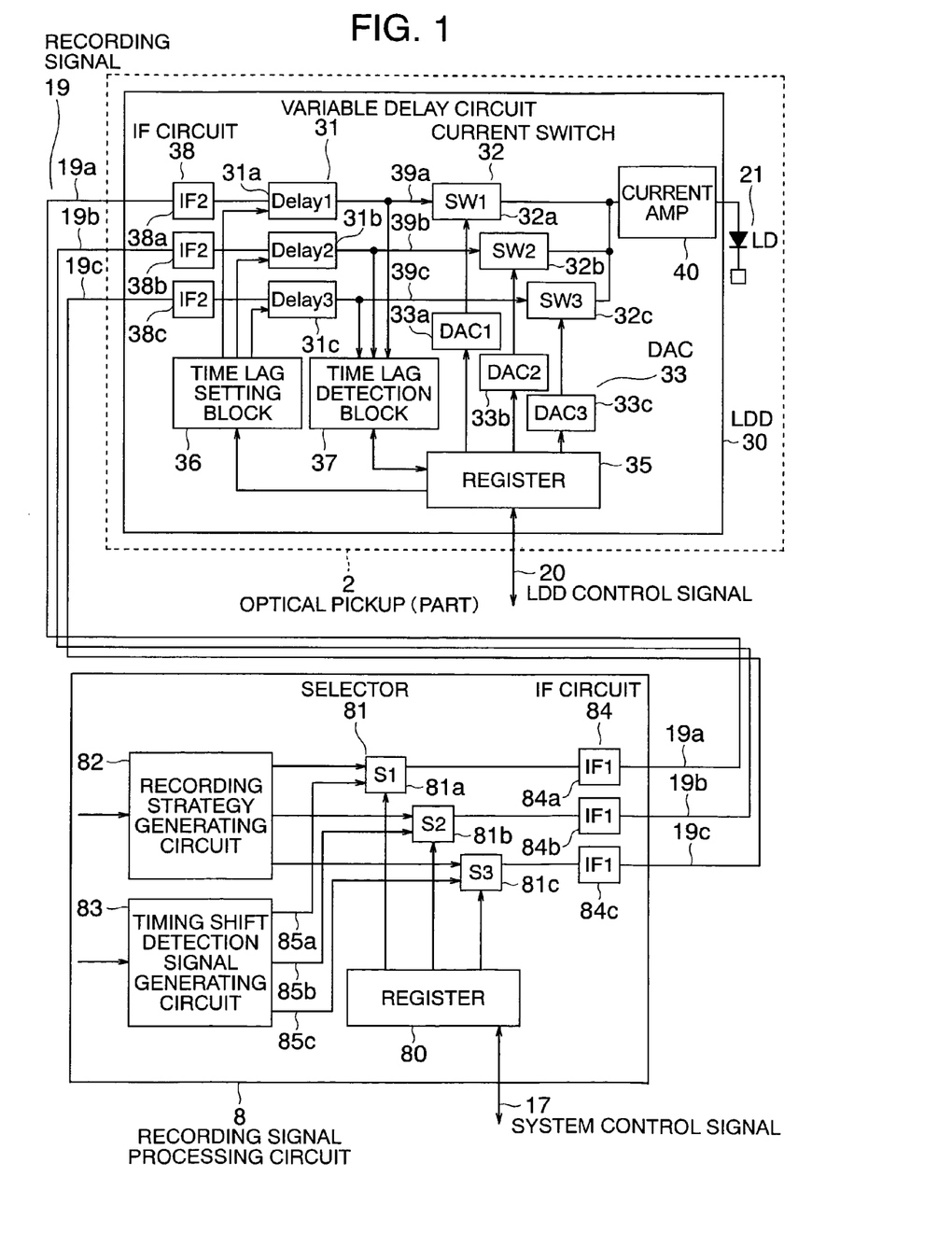
FIG. 1 shows a first embodiment of the invention.

FIG. 1 is a block diagram showing a partial configuration of the signal output unit of the recording signal processing circuit 8 and the laser driver 30 according to the first embodiment of the invention.

First, reference is made to the recording signal processing circuit 8.

In the recording mode for recording data, the data input from the interface circuit 5 is subjected to such operations as addition of an error correction code, encoding, data modulation and generation of the recording strategy, and in order to form a predetermined recording mark on the information recording layer of the optical disk, a signal for controlling the laser beam is output. In the timing shift detection mode for detecting a timing shift, on the other hand, a timing shift detection signal is output from a timing shift detection signal generating circuit.

The recording mode and the timing shift detection mode are switched to each other by setting a specified register of the register circuit 80 by a system control signal 17. In the recording mode, the selector 81 outputs the signal from the recording strategy generating circuit 82 as a recording signal 19. In the timing shift detection mode, on the other hand, the selector 81 outputs the timing shift detection signal from the timing shift detection signal generating circuit 83 as a recording signal 19.

In the recording mode, a plurality of digital signals of different timings corresponding to the recording strategy are output from the recording strategy generating circuit 82, and transmitted through the selector 81, the interface circuit 84, the printed circuit board (not shown), the flexible printed circuit board (not shown), the circuit board (not shown) on the optical pickup, the connectors for connecting the circuit boards to each other, the input interface circuit of the laser drive LSI, the variable delay circuit and the laser drive current switch in the recording signal processing circuit 8.

In the timing shift detection mode, on the other hand, a signal for detecting the timing shift (hereinafter referred to as the timing shift detection signal 85) is output from the timing shift detection signal generating circuit 83, and transmitted through the same path as in the recording mode.

In the process, the recording strategy generating circuit 82 generates the recording strategy signal from the signal after data modulation as described above. The operation of the recording strategy generating circuit 82, however, is not related directly to the invention and therefore not explained.

The selectors 81*a*, 81*b*, 81*c* are used to output the timing shift detection signal to two or more signal paths between which the detection of a timing shift is desired in the timing shift detection mode.

Further, based on the register setting by the system control signal 17, the register circuit 80 controls the selector 81 to output the timing shift detection signal for detecting the timing shift of the recording signal 19.

In detecting the timing shift between the recording signals 19*a*, 19*b* transmitted through two paths in FIG. 1, for example, the signals generated by the timing shift detection signal generating circuit 83 are selectively output through the selector 81*a* and the selector 81*b*. In detecting the timing shift between the recording signals 19*a*, 19*b*, 19*c* transmitted through three paths, on the other hand, the timing shift is detected sequentially for sets of two signals as described above. As an alternative, the signals generated by the timing shift detection signal generating circuit 83 are output by being selected as the output of the selector 81*a*, the output of the selector 81*b* and the output of the selector 81*c* thereby to the time lag between the three signals at the same time.

Next, the laser diode driver (LDD) 30 is explained. The invention exhibits the function thereof at the time of correcting the timing shift during and before recording, but is not directly related to the reproducing operation. The reproducing operation, therefore, is not explained, but the operation of the LDD 30 for recording.

Also, this embodiment is explained with reference to the laser diode driver as an example capable of setting the emission power of the laser diode to a maximum of three different levels for recording. In actual applications of the invention, however, the laser diode emission power is not limited to three types, but may be either four or two types.

The register circuit 35 is for storing the state in which the LDD control signal 20 is input. This stored state is used for internal control of the LDD 30 as an output of the register circuit 35.

The digital-to-analog converter (hereinafter referred to as DAC) 33 is for controlling the current amount flowing in the laser diode (hereinafter referred to as LD) 21 during recording, and set by the output of the register circuit 35.

The current switch (hereinafter referred to as the current SW) 32 is for turning on/off the current output from the DAC 33 in accordance with the state of the current switch control signal 39. As long as this switch is on, the output current of the DAC 33 flows into the current amplifier 40, while the output current is isolated from the current amplifier 40 when this switch is off.

The current amplifier 40 adds the current input from the current SW 32 and amplifies the current obtained by addition at a predetermined amplification factor and outputs it from the LDD 30.

The laser diode 21 is driven by the output current of the current amplifier 40 output from the LDD 30.

According to this embodiment, the cathode of the LD 21 is connected to a low-potential power supply or the ground potential, while the anode of the LD 21 is connected to the output terminal of the LDD 30, so that the output terminal of the LDD 30 constitutes a current source from which the current flows out. Nevertheless, this invention is not limited to this configuration. For example, the cathode of the LD 21 may be connected to the output terminal of the LDD 30, while the anode of the LD 21 is connected to a high-potential power supply, so that the output terminal of the LDD 30 may constitute a current sink into which the current flows.

Next, the current switch control signal 39 is explained.

The current switch control signal 39 is generated based on the recording signal 19 output from the recording signal processing circuit 8. The recording signal 19 input to the LDD 30 is input to an interface circuit (hereinafter referred to the IF circuit) 38. In the IF circuit 38, the signal converted from the signal specification of the recording signal 19 to the internal signal specification of the LDD 30 is input to the variable delay circuit 31. The variable delay circuit 31, in accordance with the setting of the time lag setting block 36, changes the propagation delay time of each of the recording signals 19*a*, 19*b*, 19*c* in the variable delay circuits 31*a*, 31*b*, 31*c*, respectively. The current switch control signals 39*a*, 39*b*, 39*c* delayed by a predetermined delay time by the variable delay circuits 31*a*, 31*b*, 31*c*, respectively, are applied to the corresponding current switches 32*a*, 32*b*, 32*c*, respectively, thereby to control the current switch timing, while at the same time being input to the time lag detection block 37. The time lag detection block 37 detects the time lag of change timing or the phase difference between those two or three current switch control signals 39 output from the variable delay circuit 31 which are designated by the output of the register circuit 35, and outputs the detection result to the register circuit 35.

Incidentally, the differential signal transmission specification of a low-voltage amplitude suitable for transmission of the high-speed digital signal called LVDS has recently been often used as a physical specification of the signal for transmitting the recording signal 19. Also this embodiment pays attention on the use of a signal transmission specification equivalent to LVDS, and the IF circuits 84, 38 are both intended to act as, but not limited to, an interface between the LSI internal signal and the LVDS signal. Also, the recording signal 19 is not necessarily electrical but may be optical.

Next, the steps of the process executed according to this embodiment are explained with reference to a flowchart.

Figure 11:
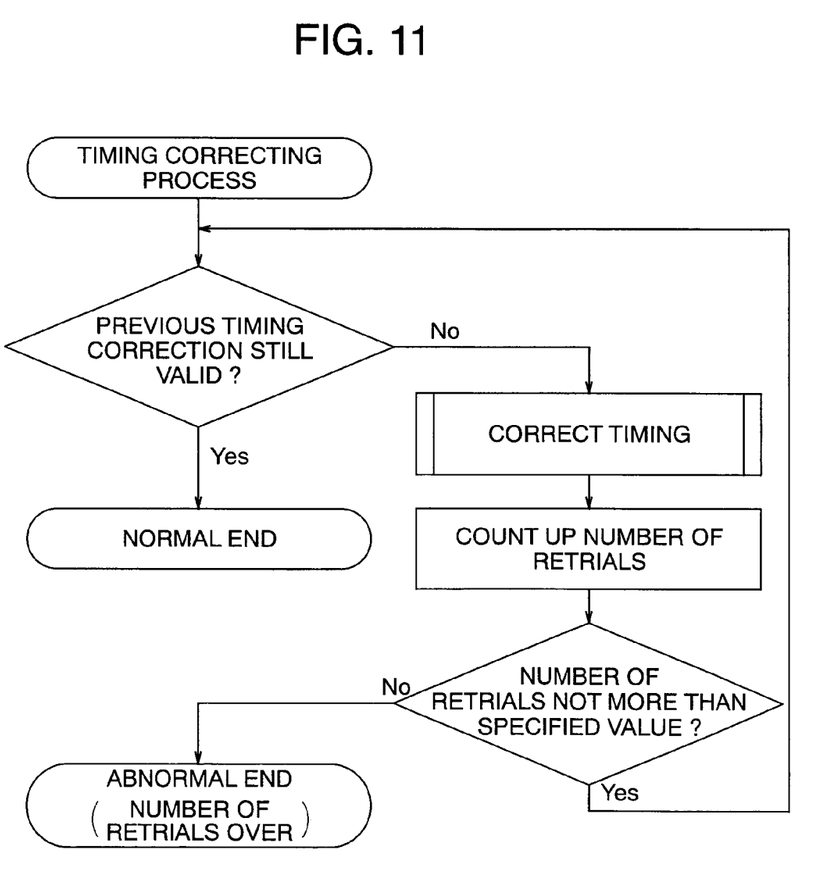
FIG. 11 is a flowchart for the timing correcting process.

FIG. 11 is a operation flowchart showing the timing shift correction process according to this embodiment.

The timing shift correction process first determines whether the timing correction process previously executed is currently effective or not. This is by reason of the fact that in the case where the environmental conditions of the previous timing correction process are considerably different from those of the current correction process, the previous correction result cannot be used as it is. The internal temperature of the apparatus and the source voltage of the related LSI are some specific examples of the environmental conditions. The environmental conditions under which the timing shift is corrected are measured and stored, and whether the previous timing correction process is currently effective or not is determined by measuring the current environmental conditions and comparing them with the values of the previous timing correction process. In this way, the effectiveness of the previous timing correction process can be determined.

This timing correction process can be simplified, without any practical problem, by using the time length elapsed from the previous timing correction as a measure of the change amount of the environmental conditions, and in the case where the elapsed time is longer than a predetermined length of time, the previous timing correction process is invalidated.

In the case where the previous timing correction process is still effective, on the other hand, the result to the particular process can be used as it is and therefore the determining process is terminated.

In the case where the previous timing correction process is currently invalid, the timing correction process is executed again. In this timing correction process, the use of the initial setting of the delay time of the variable delay circuit included in the previous timing correction result simplifies the process so that the delay time is corrected only by the difference with the previous correction result, thereby leading to the advantage of a shorter processing time.

In the case where the timing correction is carried out, the number of times it is carried out is counted, and in the case where the timing shift is not converged to less than a predetermined value, an endless loop is prevented by determining an abnormal end if the number of retrials exceeds a predetermined value.

In the case where the number of times retrials are made is not more than the predetermined number, on the other hand, it is determined again whether the timing correction process is currently valid or not. In this way, an always valid timing shift correction result can be used.

Next, the actual operation of executing the timing shift correction is explained.

Figure 12:
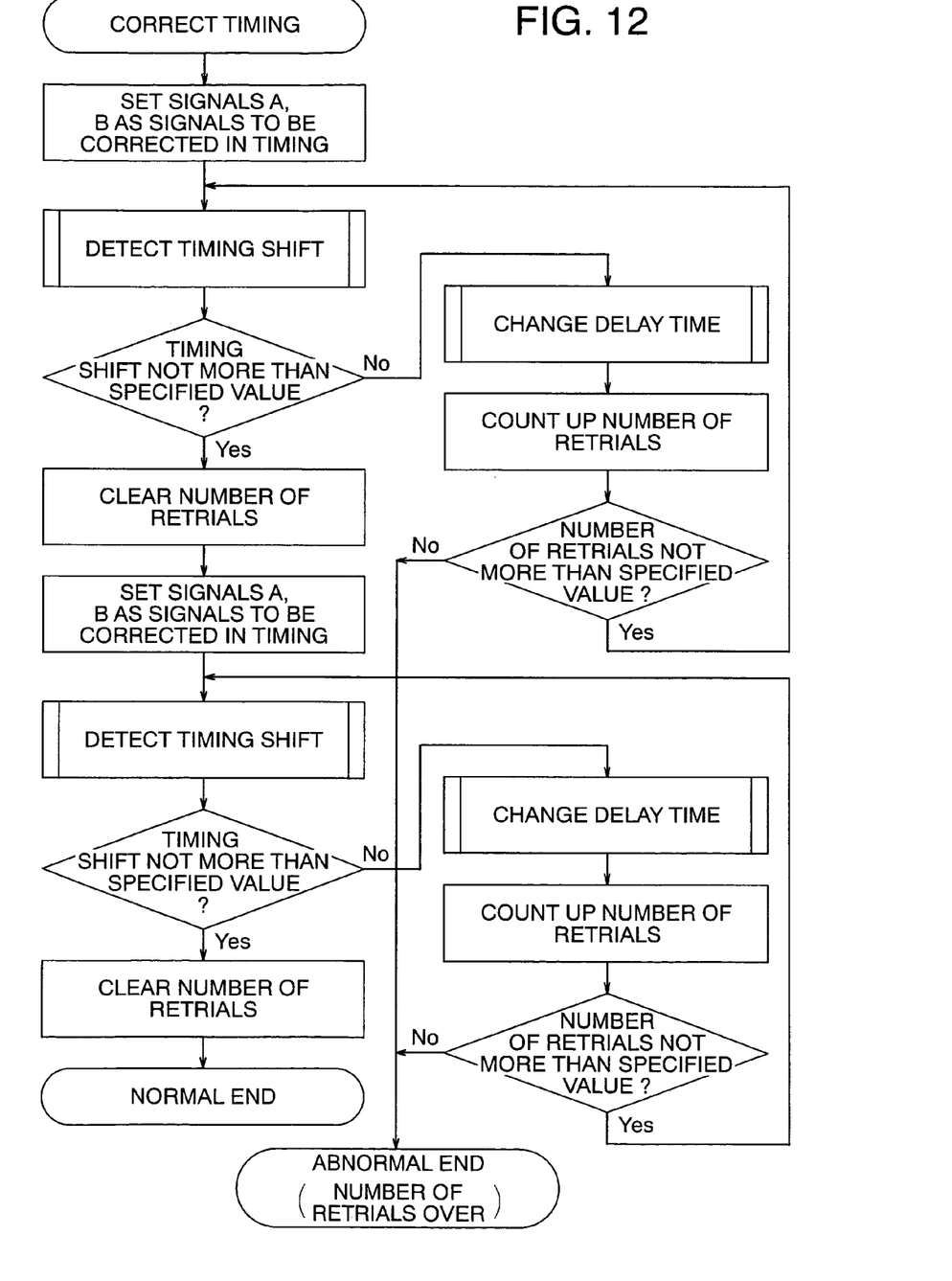
FIG. 12 is a flowchart for the timing correcting process.

FIG. 12 is an operation flowchart for the timing shift correction according to this embodiment.

First in the timing shift correction process, two signals to be corrected are set. In the case under consideration, the recording signals 19a, 19b are selected and set as signals A and B to be corrected out of the three recording signals 19a, 19b, 19c. Specifically, the register circuit 80 is set to produce the output signal of the timing shift detection signal generating circuit 83 from the recording signal 19a and the recording signal 19b, and further, the register circuit 35 is set in such a manner that the time lag detection block 37 detects the time lag of the change timing between the current switch control signal 39a and the current switch control signal 39b.

Next, the time lag of the signal change timing with the aforementioned setting is actually detected, and the result thereof is retrieved into the microcomputer 9 through the register circuit 35. From the information on the time lag thus retrieved, the microcomputer 9 determines whether the time lag is not more than a predetermined value or not. In the case where the time lag is not more than the predetermined value, the retrial number count for the timing shift correction is cleared and the process proceeds to the timing correction with the next set of the recording signals 19. In the case where the time lag exceeds the predetermined value, on the other hand, the delay time that the variable delay circuit 31 should have is calculated, and a corresponding value is set again in the variable delay circuit 31 through the register circuit 35. Next, the retrial number of times for the timing shift correction is counted up, and it is determined whether the retrial number of times is not more than a predetermined value. In the case where the retrial number of times is not more than the predetermined value, the timing shift is detected again for the delay time set again. In the case where the retrial number of times exceeds the predetermined value, on the other hand, the retrial number of times is over and the process is terminated abnormally. In this way, the timing shift can be corrected between the recording signal 19a and the recording signal 19b.

Next, the timing shift is corrected between the recording signal 19a and the recording signal 19c. This follows the same steps as the timing shift correction between the recording signal 19a and the recording signal 19b described above, except for the recording signals involved, and therefore is not explained.

Now, the method of detecting the timing shift according to the invention is explained specifically below.

Figure 3:
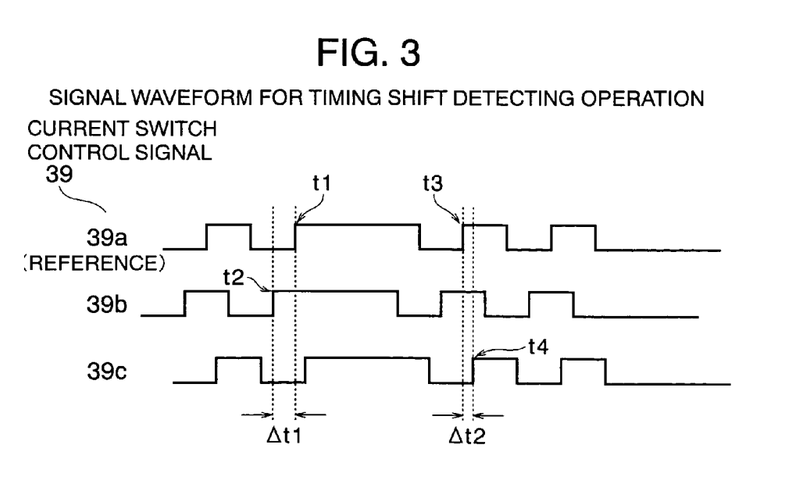
FIG. 3 is a time chart for timing shift detection according to the first embodiment.

FIG. 3 is a schematic diagram showing a signal waveform for explaining the timing shift which the current switch control signal 39 may have.

For detecting the timing shift, a reference timing signal is required. According to this embodiment, an explanation is given with the leading edge of the current switch control signal 39a as a reference, to which the invention is not limited, and any stable signal may provide a reference.

In the timing shift detection mode, the change timing of the two signals output to detect the shift amount between the two signal transmission paths to be compared are required to be known at the output terminal of the timing shift detection signal generating circuit 83 or at the output terminal of the selector 81. The signal meeting this condition and easiest to generate is signals changing at the same timing, i.e. the same signal. The timing shift detection signals 85a, 85b, 85c output from the timing shift detection signal generating circuit 83 are assumed to be the same signal changing with the same timing at the output terminal of the timing shift detection signal generating circuit 83.

In FIG. 3, the timing shift detection signal 85 controls the current switch 32 as a current switch control signal 39 through the selector 81, the IF circuit 84, the signal transmission path, the IF circuit 38 and the variable delay circuit 31, in which case the timing shift is caused by the delay time lag between the paths described above. As a result, the current switch control signals 39a, 39b, 39c are shifted from each other as shown. In the process, the time lag detection block 37 detects the shift of the current switch control signals 39 changing with the same timing. Specifically, as shown in FIG. 3, the rise timing t1 of the current switch control signal 39a is set as a timing reference, and the time lag Δt1 with the rise timing t2 of the current switch control signal 39b is detected. Since the timing t2 is advanced and therefore the time lag Δt1 assumes a negative value. Also, the rise timing t3 of the current switch control signal 39a is set as a reference, and the time lag Δt2 with the rise timing t4 of the current switch control signal 39c is detected. In this case, the timing t4 is delayed and the time lag Δt2 assumes a positive value.

Figure 6:
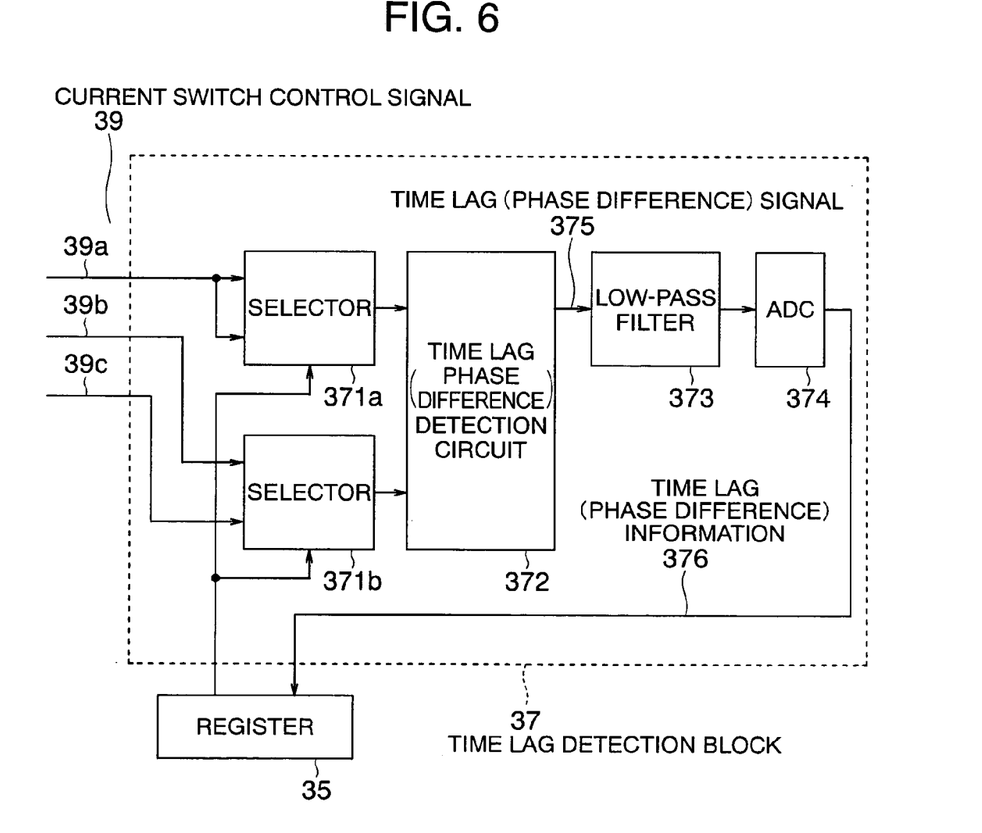
FIG. 6 shows a time lag detection block according to the first embodiment.

A method of detecting a time lag in the time-lag detection block 37 is explained. FIG. 6 is a block diagram showing the configuration of the time lag detection block 37. The current switch control signal 39 is input to a selector 371. The selector 371 is for selecting two signals between which the timing shift is detected. Since the reference is the current switch control signal 39a, the output of the selector 371 is required to be the set (39a, 39b) or the set (39a, 39c). The current switch control signal 39a is applied to the two input terminals of the selector 371a, and the current switch control signals 39b, 39c to the two input terminals of the selector 371b. The selector 371, due to the control signal input thereto from the register circuit 35, outputs one of the two signals input thereto. The output of the selector 371, therefore, is the set (39a, 39b) or the set (39a, 39c) due to the control signal from the register circuit 35. In spite of the fact that the output of the selector 371a is always the current switch control signal 39a, the selector 371a is used because of the need to give the current switch control signal 39a a propagation delay time equivalent to that of the signal 39b or 39c passed through the selector 371b. For this reason, the selector 371a and the selector 371b are configured with as small a propagation delay time lag as possible.

The two signals output from the selector are input to the time lag (phase difference) detection circuit 372, which outputs a time lag (phase difference) detection signal 375 corresponding to the time lag (phase difference) between the signals. The time lag (phase difference) detection circuit 372 is normally made up of a circuit known as a phase detector. The circuit configuration of the phase detector is well known, and not explained here as the invention is not directly related to the circuit configuration of the phase detector. The time lag (phase difference) signal 375 is input to a low-pass filter 373 to determine the average value of the timing shift amount.

The signal proportional to the timing shift amount output from the low-pass filter 373 is input to the analog-to-digital converter (ADC) 374 and converted into the time lag (phase difference) information 376 constituting the digital data corresponding to the timing shift amount. The time lag (phase difference) information 376 is input to the register circuit 35 and also to the microcomputer 9 as a LDD control signal 20 used to correct the timing shift.

Figure 4:
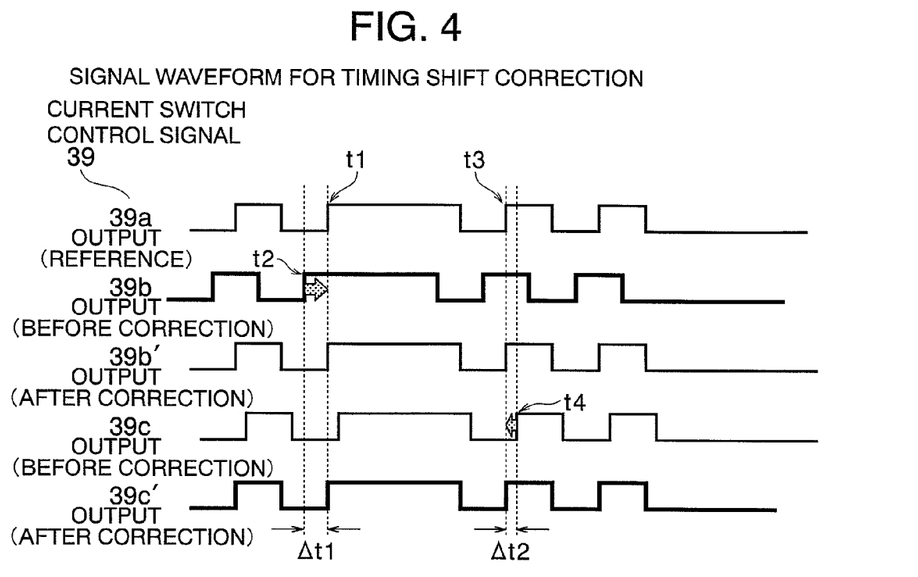
FIG. 4 is a time chart for timing shift correction according to the first embodiment.

Next, a method of correcting the timing shift based on the timing shift detected by the method described above is explained. FIG. 4 is a schematic diagram showing a signal waveform for explaining the method of reducing by correcting a known timing shift amount between the current switch control signals 39 according to the invention.

In the method shown in FIG. 3, the information on the time lag $\Delta t1$, $\Delta t2$ detected by the time lag detection block 37 is input to the microcomputer 9 through the register circuit 35. In the microcomputer 9, the advance of the current switch control signal 39b with respect to the reference current switch control signal 39a is detected from the information on $\Delta t1$, and the setting is changed in such a manner as to increase the delay time of the variable delay circuit 31b constituting the path of the current switch control signal 39b.

In the case where the relation between the change amount of the setting of the variable delay circuit and the change amount of the delay time of the variable delay circuit is known, the change amount of the setting corresponding to the change amount of the desired delay time is obtained, and the aforementioned setting after the change is determined from the obtained value and the setting before the change.

In the case where the relation between the change amount of the setting of the variable delay circuit and the change amount of the delay time of the variable delay circuit is unknown, on the other hand, the change amount of the setting corresponding to the change amount of the desired delay time is obtained as an approximate value using the relation between the change amount of the setting of the variable delay circuit given as an initial value beforehand and the change amount of the delay time of the variable delay circuit. Thus, the setting after change is determined from both the approximate value obtained and the setting before change. After executing this process, the timing shift is detected again based on the setting of the variable delay circuit after change, and the relation between the change amount of the setting of the variable delay circuit and the change amount of the delay time of the variable delay circuit is determined, based on the actual measurement, from the difference of the setting and the difference of the timing shift amount before and after the change of the delay time setting. In the subsequent timing shift correction, this relation based on the actual measurement is used as the relation between the change amount of the setting of the variable delay circuit and the change amount of the delay time of the variable delay circuit. By doing so, a highly accurate timing shift correction can be carried out based on the actual situation of the apparatus.

Assuming that the setting of the variable delay circuit 31 is changed by timing shift correction, the timing shift is detected again by the setting after change. In the case where the detected shift amount is not included in a predetermined range, the timing shift is corrected again, while in the case where the detected shift amount is included in the predetermined range, on the other hand, the timing shift correction is terminated. In this way, the accurate timing shift-correction is made possible. Also, in the case where the reliability and accuracy of the timing shift correction process are sufficiently high, the timing shift detection after changing the setting is omitted to save the processing time.

Figure 7:
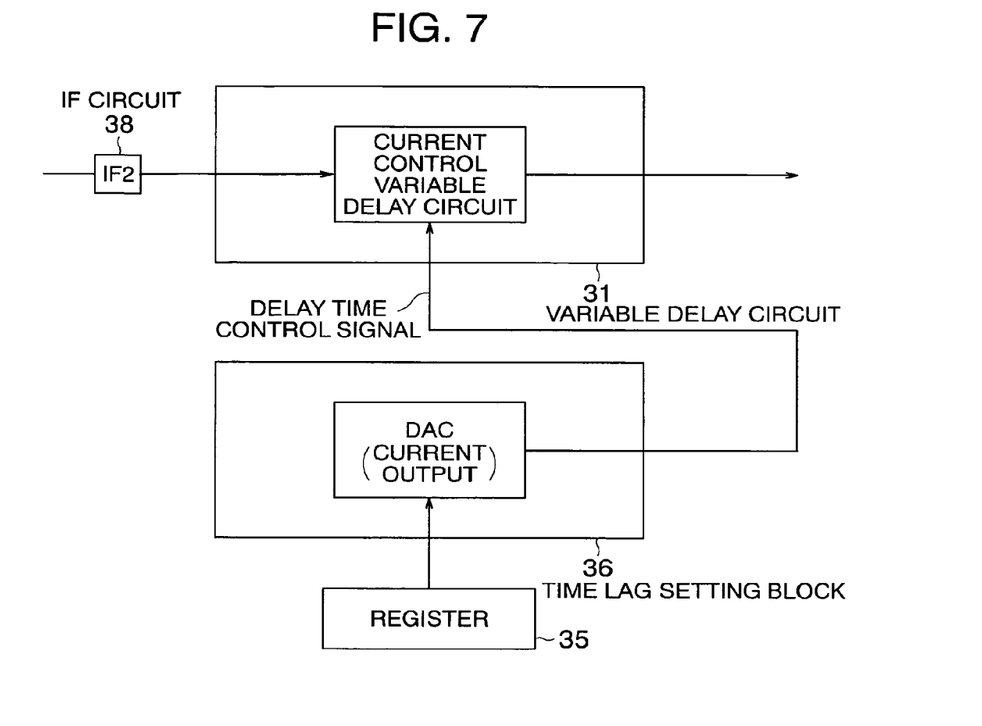
FIG. 7 shows a variable delay circuit and a time lag setting block according to the first embodiment.

Next, the method of setting the time lag in the time lag setting block 36 is explained. FIG. 7 is a block diagram showing the configuration of the time lag setting block 36 and the variable delay control circuit 31. The time lag setting circuit block 36 is configured of a digital-to-analog converter (DAC) of current output type, and can control the current amount output from the DAC by the setting from the register circuit 35. This output current constitutes a delay time control signal. Also, the variable delay circuit 31 is configured of a current control variable delay circuit, and can change the delay time by the current amount of the delay time control signal output from the DAC. The circuit configuration of the DAC and the current control variable delay circuit, which is well known and not directly related to the invention, is not explained any further.

Assume that the setting of the variable delay means can be changed only in the timing shift correction mode, while any change in the setting of the variable delay means in other than the timing shift correction mode is invalid. Then, the advantage is obtained that an erroneous change in the setting of the variable delay means in other than the timing shift correction mode has no adverse effect.

Also, assume a configuration in which at the time of changing the setting of the variable delay means, the laser light emission amount is automatically reduced to zero, or a very small amount, like the laser light emission amount for reproduction with which no data is recorded in the disk, regardless of the setting of the laser light emission amount for recording. Then, the advantage is obtained that an erroneous change in the setting of the variable delay means with the light amount set to such a value that the data can be recorded in the disk has no adverse effect.

Second Embodiment

Next, a second embodiment of the invention is explained.

This embodiment is different from the first embodiment only in the variable delay circuit block and the surrounding parts, while the other parts are the same. Therefore, only the different parts are explained while the explanation of the same parts is omitted.

Figure 10:
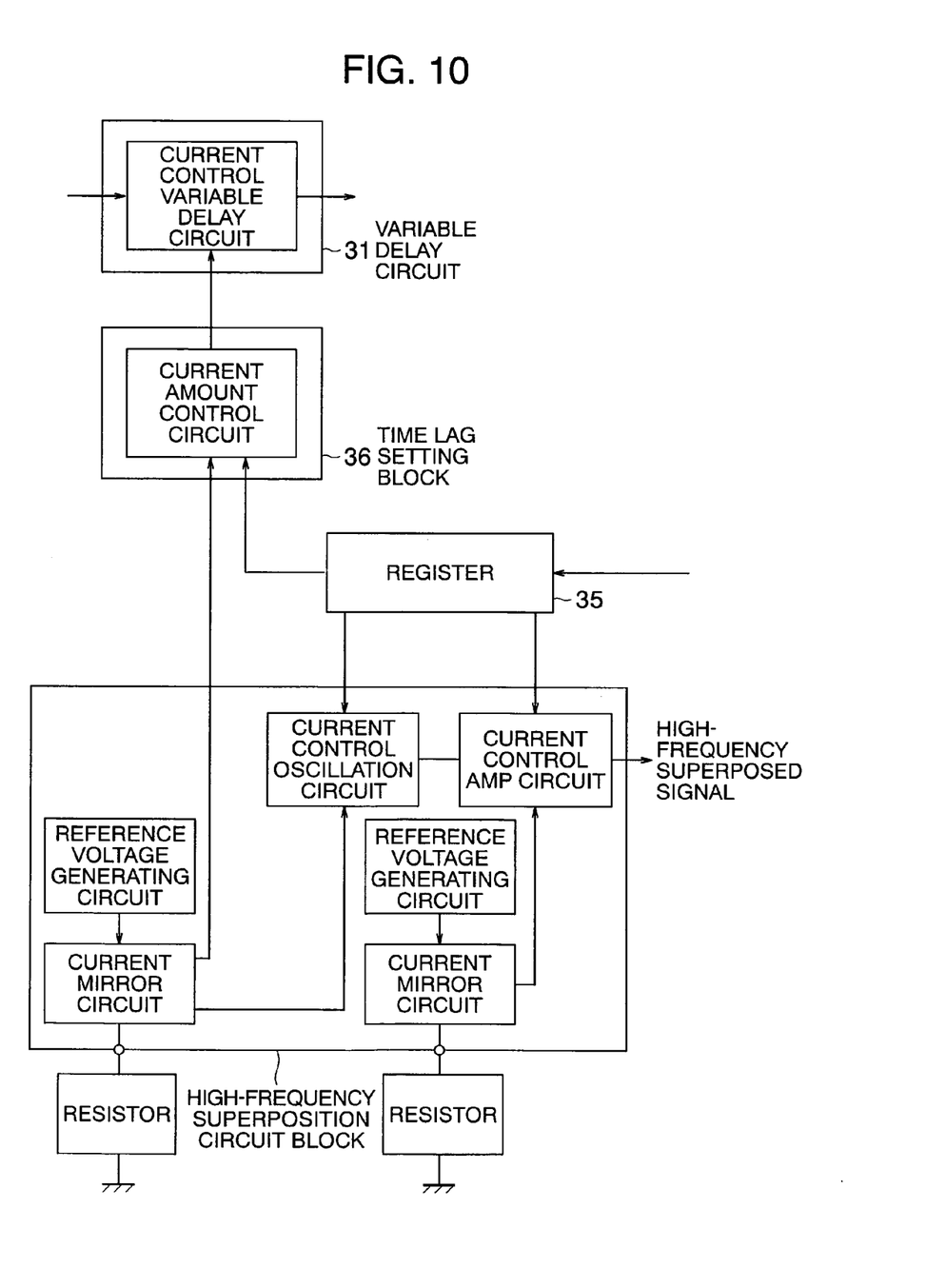
FIG. 10 shows a variable delay block according to a second embodiment.

FIG. 10 is a block diagram showing the configuration of the variable delay block and the high-frequency superposed circuit block according to the second embodiment of the invention.

Generally, the laser diode driver includes a high-frequency superposed circuit to superpose the high-frequency current of several hundred MHz on the laser drive current. The high frequency current is superposed to reduce the effect of the return laser light amount on the laser oscillation by a multimode laser oscillation and thus reduce the laser noise due to the change in the laser light emission amount. In the high-frequency superposition, the oscillation frequency and the superposition level, which are required to be set, are normally set from the value of an external resistance of the LDD and the register setting. This is to produce a stable oscillation frequency and superposition level. Specifically, a reference current source configured of a current mirror circuit is configured using a stable voltage source hardly affected by the process and environmental changes such as a band gap reference power supply capable of being configured in the LDD, based on the current of high accuracy produced from a resistor comparatively high in resistance accuracy connected to a device external to the LSI. A high-frequency signal having a stable frequency is generated by a current control oscillation circuit controlled by this reference current source. Next, the signal is amplified with a predetermined amplification factor using a current control amplifier circuit controlled by the reference current source thereby to produce a stable signal level.

The variable delay circuit according to the invention is intended to produce a more stable delay time by setting the current to control a current controlled variable delay circuit using this stable current source as a reference current source. Specifically, the reference current output from the current mirror circuit is input to a current amount control circuit of the time lag setting block. The reference current input to the current amount control circuit is multiplied by the register setting thereby to produce a stable current. The current controlled variable delay circuit of the variable delay circuit 31 controls the delay time based on the output of the current control circuit, and therefore can set a stable delay time. An example of the current amount control circuit is a digital-to-analog converter of multiplication type using the reference obtained from the current mirror circuit as a multiplication signal. Also, according to this embodiment, a current controlled oscillation circuit may be configured of a ring oscillator having an equivalent configuration to the current controlled variable delay circuit of the variable delay circuit 31. Then, the correlation is established between the delay time of the delay circuit making up the ring oscillator and the delay time of the current controlled variable delay circuit of the variable delay circuit 31. By measuring the oscillation frequency of the current controlled oscillation circuit, therefore, the delay time of the current controlled variable delay circuit can be determined advantageously.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical disk recording apparatus capable of recording information by radiation of a modulated laser beam on an optical disk, comprising:
 a recording signal generating means for generating and outputting at least two laser light emission control signals for modulating the laser beam;
 a variable delay means, corresponding to each of said at least two laser light emission control signals, to output delay time corrected laser light emission control signals after individually changing a delay time of said each laser light emission control signal;
 a delay time control means for detecting a time lag between at least two of said delay time corrected laser light emission control signals, outputting said detected time lag, and controlling the delay time of the variable delay means in accordance with said outputting time lag;
 a laser diode light emission control means for controlling timing of emission of laser light based on said at least two delay time corrected laser light emission control signals; and
 a mode control means for switching between at least a normal operation mode for normal laser light emission for optical disc recording and playing and a timing a correction mode, wherein the delay time control means controls the delay time of the variable delay means by detecting a timing shift detection result;
 wherein in the timing shift correction mode, the recording signal generating means outputs timing shift detection signals from at least two signal output terminals to output said each laser light emission control signal, said timing shift detection signals changing their levels at substantially the same time;
 wherein the delay time control means detects a timing shift between the timing shift detection signals controls and sets the delay time of the variable delay means to reduce the timing shift;
 wherein a set value of the variable delay means is changeable in the timing shift correction mode and the set value of the variable delay means is not changeable in other modes different from the timing shift correction mode; and
 wherein a laser light emission amount is set to zero when the set value of the variable delay means is changed.

2. An optical disk recording apparatus according to claim 1,
 wherein the timing shift correction mode is carried out at the time of either switching on power for the optical disk recording apparatus or performing an operation, prior to a data recording operation, associated with the data recording operation of the optical disk recording apparatus.

3. An optical disk recording apparatus capable of recording information by radiation of a modulated laser beam on an optical disk, comprising:
 a recording signal generating means for generating and outputting at least two laser light emission control signals for modulating the laser beam;
 a variable delay means, corresponding to each of said at least two laser light emission control signals, to output delay time corrected laser light emission control signals after individually changing delay time of said each laser light emission control signal;
 a time lag detection means for detecting a time lag between at least two of said delay time corrected laser light emission control signals and outputting said time lag;
 a time lag setting means for outputting a delay time control signal to control a delay time of the variable delay means;
 a controller for controlling the delay time control signal in accordance with a timing shift detection result;
 a laser diode light emission control means for controlling timing of emission of laser light based on the delay time corrected laser light emission control signals; and
 a mode control means for switching between a normal operation mode for normal laser light emission and a timing shift correction mode for detecting and correcting the timing shift detection result;

wherein in the timing shift correction mode, the recording signal generating means outputs timing shift detection signals from at least two signal output terminals to output said each laser light emission control signal, the timing shift detection signals changing their levels at substantially the same time; the time lag detection means detects a timing shift between the timing shift detection signals and outputs the timing shift detection result; and the controller controls a setting of the time lag setting means in such a manner as to reduce the timing shift in accordance with the timing shift detection result;

wherein the variable delay means corrects the delay time corresponding to the setting of the time lag setting means and outputs said delay time corrected laser light emission control signals;

wherein a set value of the variable delay means is changeable in the timing shift correction mode and the set value of the variable delay means is not changeable in other modes different from the timing shift correction mode; and wherein a laser light emission amount is set to zero when the set value of the variable delay means is changed.

4. An optical disk recording apparatus capable of recording information by radiation of a modulated laser beam on an optical disk, comprising:

a recording signal generating means for generating and outputting at least two laser light emission control signals for modulating the laser beam;

a variable delay means, corresponding to each of said at least two laser light emission control signals, to output delay time corrected laser light emission control signals after individually changing delay time of said each laser light emission control signal;

a time lag detection means for detecting a time lag between at least two of said delay time corrected laser light emission control signals and outputting said time lag;

a time lag setting means for outputting a delay time control signal to control a delay time of the variable delay means;

a controller for controlling the delay time control signal in accordance with a timing shift detection result;

a laser diode light emission control means for controlling timing of emission of laser light based on the delay time corrected laser light emission control signals; and a mode control means for switching between a normal operation mode for normal laser light emission and a timing shift correction mode for detecting and correcting the timing shift detection result;

wherein in the timing shift correction mode, the recording signal generating means outputs timing shift detection signals from at least two signal output terminals to output said each laser light emission control signal, the timing shift detection signals changing their levels at substantially the same time; the time lag detection means detects a timing shift between the timing shift detection signals and outputs the timing shift detection result; and the controller controls a setting of the time lag setting means in such a manner as to reduce the timing shift in accordance with the timing shift detection result; and wherein the variable delay means corrects the delay time corresponding to the setting of the time lag setting means and outputs said delay time corrected laser light emission control signals;

wherein the recording signal generating means is integrated with, built in or mounted on a digital signal process means for generating and encoding the recording data; and wherein the variable delay means, the time lag detection means, the time lag setting means and the laser diode light emission control means are integrated with, built in or mounted on a laser diode drive means included in an optical pickup.

5. An optical disk recording apparatus according to claim 4, wherein the laser light emission amount is set under a value that can record data on the optical disk when the set value of the variable delay means is changed.

6. An optical disk recording apparatus capable of recording information by radiation of a modulated laser beam on an optical disk, comprising:

a recording signal generating means for generating and outputting at least two laser light emission control signals for modulating the laser beam;

a variable delay means, corresponding to each of said at least two laser light emission control signals, to output delay time corrected laser light emission control signals after individually changing delay time of said each laser light emission control signal;

a time lag detection means for detecting a time lag between at least two of said delay time corrected laser light emission control signals and outputting said time lag;

a time lag setting means for outputting a delay time control signal to control a delay time of the variable delay means;

a controller for controlling the delay time control signal in accordance with a timing shift detection result;

a laser diode light emission control means for controlling timing of emission of laser light based on the delay time corrected laser light emission control signals; and a mode control means for switching between a normal operation mode for normal laser light emission and a timing shift correction mode for detecting and correcting the timing shift detection result;

wherein in the timing shift correction mode, the recording signal generating means outputs timing shift detection signals from at least two signal output terminals to output said each laser light emission control signal, the timing shift detection signals changing their levels at substantially the same time; the time lag detection means detects a timing shift between the timing shift detection signals and outputs the timing shift detection result; and the controller controls a setting of the time lag setting means in such a manner as to reduce the timing shift in accordance with the timing shift detection result; and wherein the variable delay means corrects the delay time corresponding to the setting of the time lag setting means and outputs said delay time corrected laser light emission control signals;

wherein the recording signal generating means is integrated with, built in or mounted on a digital signal process means for generating and encoding the recording data; and wherein the variable delay means, the time lag detection means, the time lag setting means and the laser diode light emission control means are integrated with, built in or mounted on a laser diode drive means included in an optical pickup;

wherein the recording signal generating means and the variable delay means are connected by a flexible signal transmission means not to hamper the movement of the optical pickup; and wherein the setting for timing shift correction is switched in accordance with the change in the signal transmission status due to the change in the flexibility of the flexible signal transmission means.

7. A laser diode driving apparatus used for an optical disk recording apparatus capable of recording information by radiation of a modulated laser beam on an optical disk, comprising:

a variable delay means supplied with each of at least two laser light emission control signals output from a recording signal generating means to output delay time corrected laser light emission control signals after individually changing a delay time of said each laser light emission control signal;

a delay time control means for detecting a time lag between at least two of said delay time corrected laser light emission control signals, outputting a detected time and controlling the delay time of the variable delay means in accordance with a timing shift detection result;

a laser diode light emission control means for controlling timing of emission of laser light based on the delay time corrected laser light emission control signals;

a mode control means for switching between a normal operation mode for normal laser light emission and a timing shift correction mode for detecting and correcting a timing shift of said each delay time corrected laser light emission control signal;

wherein in the timing shift correction mode, the delay time control means detects the timing shift between timing shift detection signals controls and sets the delay time of the variable delay means in such a manner as to reduce the timing shift, the timing shift detection signals changing their levels at substantially the same time;

wherein a set value of the variable delay means is changeable in the timing shift correction mode and the set value of the variable delay means is not changeable in other modes different from the timing shift correction mode; and wherein a laser light emission amount is set to zero when the set value of the variable delay means is changed.

8. A laser diode driving apparatus for the optical disk recording apparatus according to claim 7, wherein the setting of the variable delay means is changed in the timing shift correction mode.

9. A laser diode driving apparatus for the optical disk recording apparatus according to claim 7, wherein a laser light emission amount can be automatically set to a predetermined value at the time of changing the setting of the variable delay means regardless of the setting of the laser light emission amount for recording.

10. A laser diode driving apparatus used for an optical disk recording apparatus capable of recording information by radiation of a modulated laser beam on an optical disk, comprising:

a variable delay means supplied with each of at least two laser light emission control signals output from a recording signal generating means to output delay time corrected laser light emission control signals after individually changing a delay time of said each laser light emission control signal;

a time lag detection means for detecting a time lag between at least two of said delay time corrected laser light emission control signals;

a time lag setting means for outputting a delay time control signal to control the delay time of the variable delay means;

a laser diode light emission control means for controlling timing of emission of laser light based on the delay time corrected laser light emission control signals; and a mode control means for switching between a normal operation mode for normal laser light emission and a timing shift correction mode for detecting and correcting the timing shift of said each delay time corrected laser light emission control signal;

wherein in the timing shift correction mode, the time lag detection means detects the timing shift between timing shift detection signals changes the delay time of the variable delay means in accordance with the setting of the time lag setting means, the timing shift detection signals changing their levels at substantially the same time, wherein a set value of the variable delay means is changeable in the timing shift correction mode and the set value of the variable delay means is not changeable in other modes different from the timing shift correction mode, wherein a laser light emission amount is set to zero when the set value of the variable delay means is changed.

* * * * *